(12) United States Patent
Webb

(10) Patent No.: US 9,082,312 B2
(45) Date of Patent: Jul. 14, 2015

(54) PHYSICAL ACTIVITY INSTRUCTIONAL APPARATUS

(75) Inventor: Spencer Webb, Windham, NH (US)

(73) Assignee: Antennasys, Inc., Windham, NH (US)

( * ) Notice: Subject to any disclaimer, the term of this patent is extended or adjusted under 35 U.S.C. 154(b) by 1 day.

(21) Appl. No.: 13/467,990

(22) Filed: May 9, 2012

(65) Prior Publication Data

US 2013/0302768 A1 Nov. 14, 2013

(51) Int. Cl.
G09B 19/00 (2006.01)

(52) U.S. Cl.
CPC .................................. G09B 19/0038 (2013.01)

(58) Field of Classification Search
CPC ........... G09B 19/0038; G09B 19/0007; G09B 19/003; G09B 19/0015
USPC ........................................................ 434/247
See application file for complete search history.

(56) References Cited

U.S. PATENT DOCUMENTS

| 8,608,480 | B2* | 12/2013 | Chan et al. ..................... 434/258 |
| 2010/0015585 | A1* | 1/2010 | Baker ............................ 434/247 |
| 2010/0035688 | A1* | 2/2010 | Picunko ......................... 463/39 |
| 2011/0021273 | A1* | 1/2011 | Buckley et al. ................ 463/31 |

* cited by examiner

*Primary Examiner* — Robert J Utama
*Assistant Examiner* — Elroy S Crocker
(74) *Attorney, Agent, or Firm* — ARC IP Law, PC; Joseph J. Mayo

(57) ABSTRACT

A physical activity instructional apparatus that enables at least audio instruction, detection of movement and audio feedback based on the detected movement during the performance of a sequence of positions or moves. Embodiments enable a human to learn a sequence of martial arts moves, dance steps, yoga positions, golf, tennis or baseball swing, or any other type of physical activity involving a sequence of positions or moves, for example while being prompted to perform the positions or moves in sequence. Embodiments may utilize a mobile device that includes at least an audio output and which then detects movement and then provides audio or tactile feedback based on that movement to inform the student as to the correct or incorrect performance, for example without requiring a visual display.

20 Claims, 4 Drawing Sheets

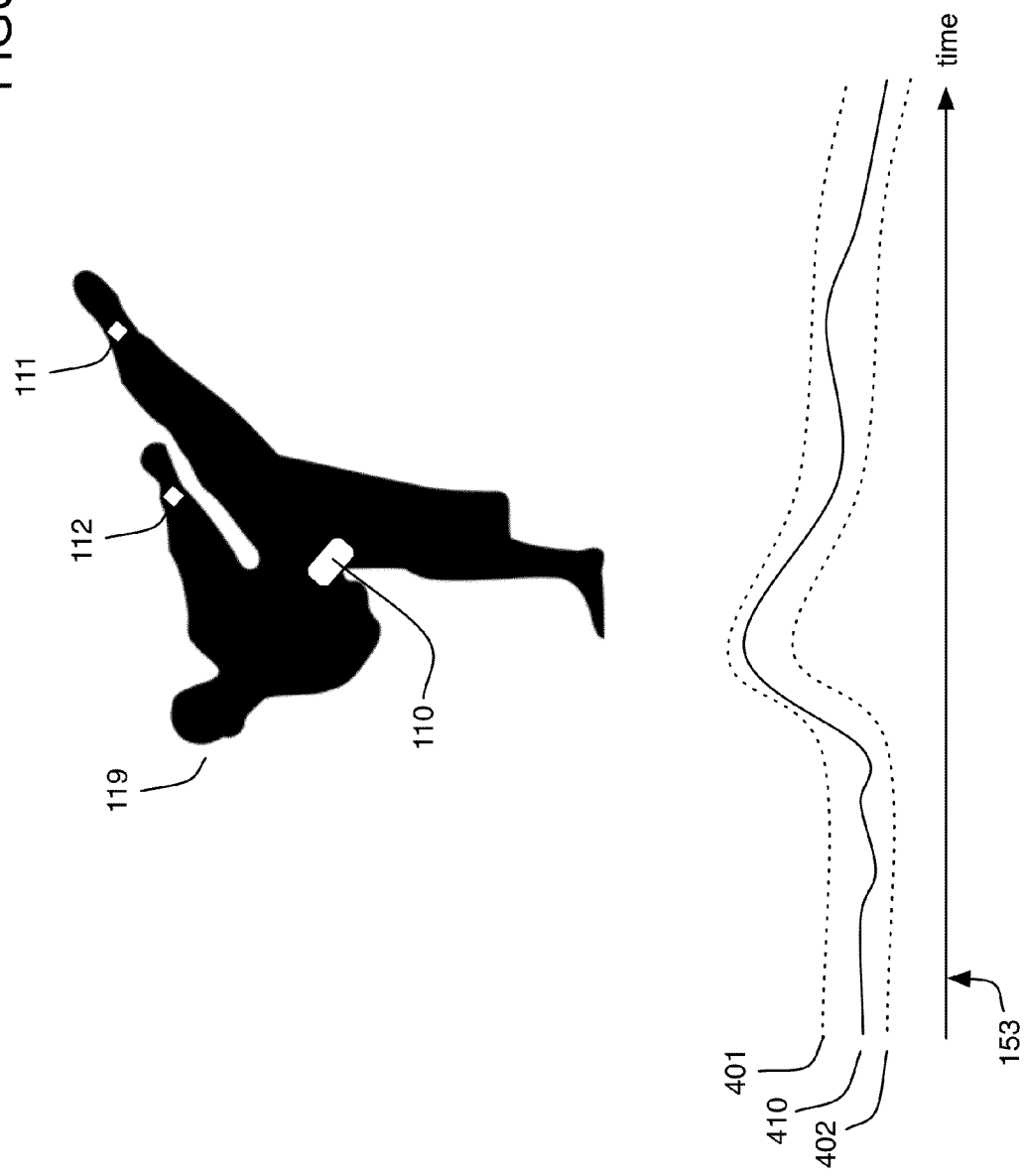

PHYSICAL ACTIVITY INSTRUCTIONAL APPARATUS

BACKGROUND OF THE INVENTION

1. Field of the Invention

One or more embodiments of the invention are related to the field of education and demonstration related to physical activities. More particularly, but not by way of limitation, one or more embodiments of the invention enable a physical activity instructional apparatus configured to enable at least audio training and/or guidance, for example related to any motion based task, detection of movement, optional audio command receipt and audio feedback based on the detected movement, for example without requiring a video display.

2. Description of the Related Art

Learning or performing a physical activity or "sequence" of body positions or movements for example requires knowledge of positions or moves and the order in which those positions or moves are to be performed. Such physical activities include but are not limited to dance, martial arts, yoga, ice-skating, gymnastics, acrobatics and free running to name a few. In addition, these physical activities may be broken down into sub-motion sequences, for example a swing in golf, tennis or baseball, or any other activity that includes positions and timings for portions of the body in a particular order, for example wrist, arm, shoulder, hip motion and/or position that occur in a particular order. Other types of physical activities include complex tasks, checklists, cardio pulmonary resuscitation (CPR) or any other physical activity. The positions or moves may be learned or utilized for example with a teacher initially or by mirroring or mimicking another person or video of a person or instruction manual for example. It is sometimes difficult to know if one is positioned or moving in the desired manner unless a teacher is watching and providing feedback, or unless immediate feedback is provided, for example via a mirror or other direct visual real-time feedback. This is not always possible depending on the position and/or speed and orientation of the movement since a person cannot see all parts of their body while moving or positioned in a particular orientation.

Although the number of positions or moves in any given activity is finite, the permutations of positions or moves that may occur in a given order is infinite since the length of a sequence may be any length. Thus, in general, sequences are difficult to learn based on the enormous size of the set of potential positions or moves that may occur in a given order. For example, this is analogous to learning the English alphabet, e.g., 26 things to learn, and then learning sequences of the letters, i.e., words that utilize that alphabet, e.g., 100,000+ words in English for example.

For example, in yoga, there are at least 600 fairly standard positions, which are known as postures or "asanas", for example which are defined in the classic yoga book "*Light on Yoga*". The postures listed therein are by no means the complete set of postures, however, the number of permutations in a random selection of only 10 postures that are not repeated is n!/(n−k!) or 600!/(600−10)!, which equals 5,607,472,330, 895,911,994,149,632,000. To provide frameworks in which students may study and learn sequences, certain forms of yoga have developed sequences of moves known as "series". Ashtanga yoga for example defines "first series" as 5 sun salutation A and B sequences and about 60 positions some of which are performed on left and right sides, intertwined with various "vinyasa" sequences that combine to form a series. First series is therefore on the order of 1000 positions that occur in the sequence. Learning the sequence may entail learning subsequences such as the sun salutations and vinyasa forms and then merely learning the order of the positions. This simplifies the problem of learning 1000 positions down to learning on the order of 100 or so positions and moves. In the best case, the student must memorize the positions in order by looking at a chart and then performing the postures. This is not allowed while practicing in a class, for example during "Mysore" practice and as such requires that the student memorize the sequence before practicing.

In martial arts, a student is not allowed to look at a chart while performing in front of a teacher, or for that matter an opposing combatant, which could be dangerous. The positions or moves in each sequence must be memorized before being performed. In Shotokan karate, a "tsuki" or punch, or "age uke" or block may be performed before and after many other "dachi" or stances, turns, pauses, etc., and learning the sequence of roughly two dozen positions or moves in each of the 26 sequences of Shotokan is very time consuming.

In dance, although "first position" is a known position, it may occur in a myriad of points in time during a dance, before and after other positions or moves. As is known there are a large number of dances, but the number of positions or moves is finite and many positions or moves are shared between different genres of dance, albeit slightly modified. Knowing how to perform a particular position or move does not aid one in learning a complex sequence. Thus, instructors have created dance step diagrams that show arrows for the directions of travel of feet with annotations describing other movements or dynamics to apply at given points in the dance. The trouble with these types of diagrams is that they cannot easily be viewed while actually dancing. Other mechanical and visual based devices have been utilized to instruct students as to the position of feet or what a dance should look like, but again, these devices are difficult to utilize when actually performing the sequence of positions or moves that make up a dance. Ice skating presents even more problems as skating on ice and looking at a chart could be dangerous to the student or other students.

Known motion capture systems tend to be utilized to analyze and/or optimize a player's swing or that are utilized for movie motion capture to animate computer generated characters. These systems, among other game related systems are known to exist, but generally provide visual feedback in one form or another to optimize a single specialized physical move, swing, or other relatively short time event. These systems are generally not used for learning a sequence of two or more different positions or moves. For example, known systems are configured to analyze a golf swing in extreme visual detail. In addition, the object of motion capture systems for golf analyze a swing and provide visual feedback after the swing, so the golfer can learn to swing in a more powerful and consistent manner.

Behavioral scientists such as Konrad Lorenz and B. F. Skinner studied and analyzed innate behavior, or ethology and learning in animals or behavioral analysis respectively. Much of the terminology used in modern day animal behavior and behaviorism is a result of these scientists. Learning in animals for example may be undertaken by providing "primary reinforcers", for example a reward after an animal including a human has performed a desired position or move. The reward may be food, or any other thing or activity desired by the performer. Food is but one reward that may be utilized in teaching animals. For adult humans, sometimes the reward is simply knowing that the correct position or moved has been achieved. For children, sometimes the reward may be a toy or sticker for example. A "secondary reinforcer", or event marker is a message that is given close to the moment that the desired position or move is performed to let the performer know that the primary reinforcer or reward is forthcoming. The event marker may be a sound or other stimulus, for example that may be brief enough in time to mark the specific position or move as being desired. A "tertiary reinforcer", or cue is given to the performer to let the performer know which position or move to perform to receive the secondary reinforcer or event marker, and thus the primary reinforcer, the reward. Karen Pryor began training animals with "clickers", which make a brief sound. Ms. Pryor has been training animals and humans using only positive reinforcement, to accelerate learning. She believes that aversive or corrective actions tend to limit the desire of the performer to try things differently, which limits the speed at which the performers learn. "TAGteach" is a human oriented version of Ms. Pryor's clicker training "TAG" is an acronym for "Teaching with Acoustical Guidance". Ms. Pryor teaches that clickers may be utilized for training humans to perform positions or moves, for example that they cannot themselves view. For example, some coaches use clickers to tag or mark events such as "toes pointed", "legs together", "back straight" when teaching handstands, wherein the performer generally cannot see various body parts, but can hear a marker signal or click to determine when these positions or moves are achieved. The tertiary reinforcer in human TAG training starts with "The tag point is . . . ". This indicates to the performer the position or move that will yield a secondary reinforcer or event marker or tag, which will yield the primary reinforcer or reward, for example beads or the knowledge that the position or move was achieved. Tag points are "precise, observable and measurable acts" that do not use the word "and". Tag points are not relative, i.e., "run faster", but rather specific, "raise your foot until it is level with your knee". This eliminates subjective event marking and lets the performer know if they performed the position or move. Click training appears to utilize the amygdala portion of the brain to more rapidly learn and forms longer lasting memory. This type of training requires a trainer to watch and click when tag points are achieved.

For at least the limitations described above there is a need for a physical activity instructional apparatus that enable at least audio training and/or guidance for motion based tasks, detection of movement, optional audio command receipt and audio feedback based on the detected movement during the performance of a sequence of positions or moves, and for example does not require the performer or student to look at a visual display while performing.

BRIEF SUMMARY OF THE INVENTION

One or more embodiments described in the specification are related to a physical activity instructional apparatus that enables at least audio training and/or guidance for motion based tasks, detection of movement, optional audio command receipt and audio feedback based on the detected movement during the performance of a sequence of positions or moves, for example without requiring a visual display. Embodiments enable a human to learn or perform a sequence of martial arts moves, dance steps, yoga positions, golf, tennis or baseball swing, checklist or medical task or any other type of physical activity involving a sequence of positions or moves, for example while being prompted to perform the positions or moves in sequence. Embodiments of the invention may utilize a mobile device that includes at least an audio output and which then detects movement and then provides audio or tactile feedback based on that movement to inform the student as to the correct or incorrect performance, for example without requiring a visual display. Embodiments may optionally provide an audio input to accept commands from the performer to speed up, slow down, repeat or otherwise request information from the system.

Embodiments of the physical activity instructional apparatus may include a physical orientation detector and a mobile computer. The physical orientation detector may include any combination of accelerometers and gyroscopes and/or inertial navigation system components in any number of axes so long as a position or move may be detected for the intended field of endeavor. As is known in the art, such accelerometers, gyroscopes and inertial navigation systems occur in integrated chipsets that are commercially available. Embodiments of the invention also generally employ a mobile computer associated with a student. For example a "Smartphone" or other device such as a tablet computer, such as an IPAD® may be utilized as a mobile computer in one or more embodiments of the invention. The mobile computer may include an audio output, for example to play instructive messages, a memory, for example to hold audio clips and profiles of positions or moves and a central processing unit. The central processing unit is generally coupled with the audio output and the memory wherein the central processing unit is configured to play a first audio clip on the audio output wherein the first audio clip is associated with a first position or move. This audio clip for example may be utilized to provide the tertiary reinforcer, or cue to prompt the user to perform a named position or move. One such move may include a karate punch of many varieties, or for the student to yell "kiai", or pause, etc. The central processor is generally also configured to obtain at least one physical orientation and/or movement of position for example with respect to time from the physical orientation detector. This may involve any type of query or interrupt from the physical orientation detector to obtain a location, orientation (magnetic or with respect to the horizon or both), velocity, acceleration, angular velocity, or any other quantity that enables the determination of a position or move. The central processing unit then generally is configured to play a second audio clip on the audio output based on the at least one physical orientation. This may involve playing an audio clip associated with the next position or move, if the detected at least one physical orientation is within an acceptable range of the position or move that should occur at that point in the sequence, or an instructional or optionally corrective audio message to help the student understand what parameters are within or optionally out of a defined range. After the sequence is performed, a congratulatory message, with respect to the duration of the sequence or any other message may be played.

In one or more embodiments, the physical orientation sensor is physically coupled with the mobile computer and the mobile computer is physically coupled with the student. In this embodiment, the mobile computer contains the sensor that determines how a student is positioned or how a student has moved. Profiles of the various positions and/or moves are stored in memory and compared against the detected values to determine whether the student is in a given orientation or position or has performed a particular move.

In one or more embodiments, one or more sensors that are not located in the mobile computer are utilized to determine position or moves, for example on extremities of the student and relay the positions to the mobile computer. The mobile computer may also optionally include a sensor that may be utilized in combination with the other sensors for example. In these embodiments, the physical orientation sensor(s) is/are physically coupled with the student and the mobile computer is or is not physically coupled with the student.

In order to determine whether a student has performed a particular position or move, at least one physical orientation is compared against a threshold or range of values that define the first position. In one or more embodiments this occurs by sampling the location, orientation, velocity, angular velocity and/or acceleration and comparing the curve with the curve or value of a given orientation or move. For example, if the mobile computer contains the physical orientation sensor, and it is mounted on the student's waist, then a curve for acceleration that indicates a clockwise punch rotation is compared to the detected values to determine if the student has rotated in that manner, for example with a range of rotation speeds. Any other method of comparing detected sensor values with a desired position or move value or time curve is in keeping with the spirit of the invention. This motion curve may be broken into time segments that represent different phases or sub-positions or sub-motions for a given position or move. For example, different sections of a curve may be related to a backswing, a wrist rotation, initiation of a downswing, etc., and may overlap in time as for example the wrist curve may contain angular rates of rotation during the backswing and the downswing curves for example. Any number of values or ranges or curves may be utilized to make up a position or movement threshold or range to compare against. In addition, multiple position and/or motion and/or acceleration curves or any other derivative with respect to time may be utilized per position or move to judge or rate a particular position or move with respect to novice, expert or master or any other range of categories as desired.

The central processing unit may play an event marker, for example play a click or other sound as an event marker if the position or move is within range or above at or below a threshold for example.

The central processing unit may play a second audio clip that is associated with a second position or move in the sequence if the at least one physical orientation is associated with the first position or move. For example, if the student is initially learning the sequence or performing the task checklist for example, the second audio clip may play and indicate the name of the next move in the sequence if the first position or move in the sequence was correctly performed. Alternatively, the second audio clip may include any audio message that is instructive or optionally corrective in nature if the first position or move was not according to the desired sequence. For example, the second audio clip may be a replay of the first audio clip if the at least one physical orientation is not associated with the first position or move. Alternatively, the second audio clip may indicate that the position does not meet a threshold, e.g., "legs not to within 10 degrees of vertical", or does not fall within a range, e.g., "angular velocity not between 1000 and 1250 degrees per second". Alternatively or in combination, if the student is performing the sequence correctly and pauses for a certain amount of time, indicating that the student is prompting the mobile computer for the next position or move, i.e., the student forgot the sequence, then the second audio clip may be played indicating the next position or move. If the sequence has been performed in entirety, then the second audio clip may indicate a sequence oriented secondary or primary reinforcer or congratulatory audio clip, and/or total time of duration or any other audio clip as desired including humorous audio clips, such as movie quotes, e.g., "wax on wax off", etc.

Embodiments of the system are not limited to audio information exchange, but may also use tactile or vibratory means of communicating correct or incorrect positions or moves in the sequence. For example, the mobile computer may vibrate if the position or move is out of sequence, or for fully positive reinforcement embodiments, may not indicate incorrect behavior at all. In one or more embodiments, the student may pause to request the name of the next move, or alternatively, the student may attempt another position or move without another cue.

In one or more embodiments of the invention, the mobile computer may further include an audio input wherein the central processing unit is further configured to wait for audio input before the play of the second audio clip. For example, the student may say "next move" wherein the computer then plays the audio clip associated with the next move. The central processing unit may also be configured to accept commands such as "slow down" or "speed up" with respect to the speed of the sequence of positions or moves.

Embodiments of the invention do not require a visual display, unlike known devices, however, a visual display may be utilized. For example, the mobile computer may play a video of the sequence when requested by the student.

BRIEF DESCRIPTION OF THE DRAWINGS

The above and other aspects, features and advantages of the invention will be more apparent from the following more particular description thereof, presented in conjunction with the following drawings wherein:

FIG. 4 illustrates a comparison of a move envelope with actual sensor data obtained from one of the sensors in the mobile computer or otherwise coupled with the student.

DETAILED DESCRIPTION

A physical activity instructional apparatus will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention. Performer and student as utilized herein may be utilized interchangeably in one or more embodiments of the invention.

Figure 1:
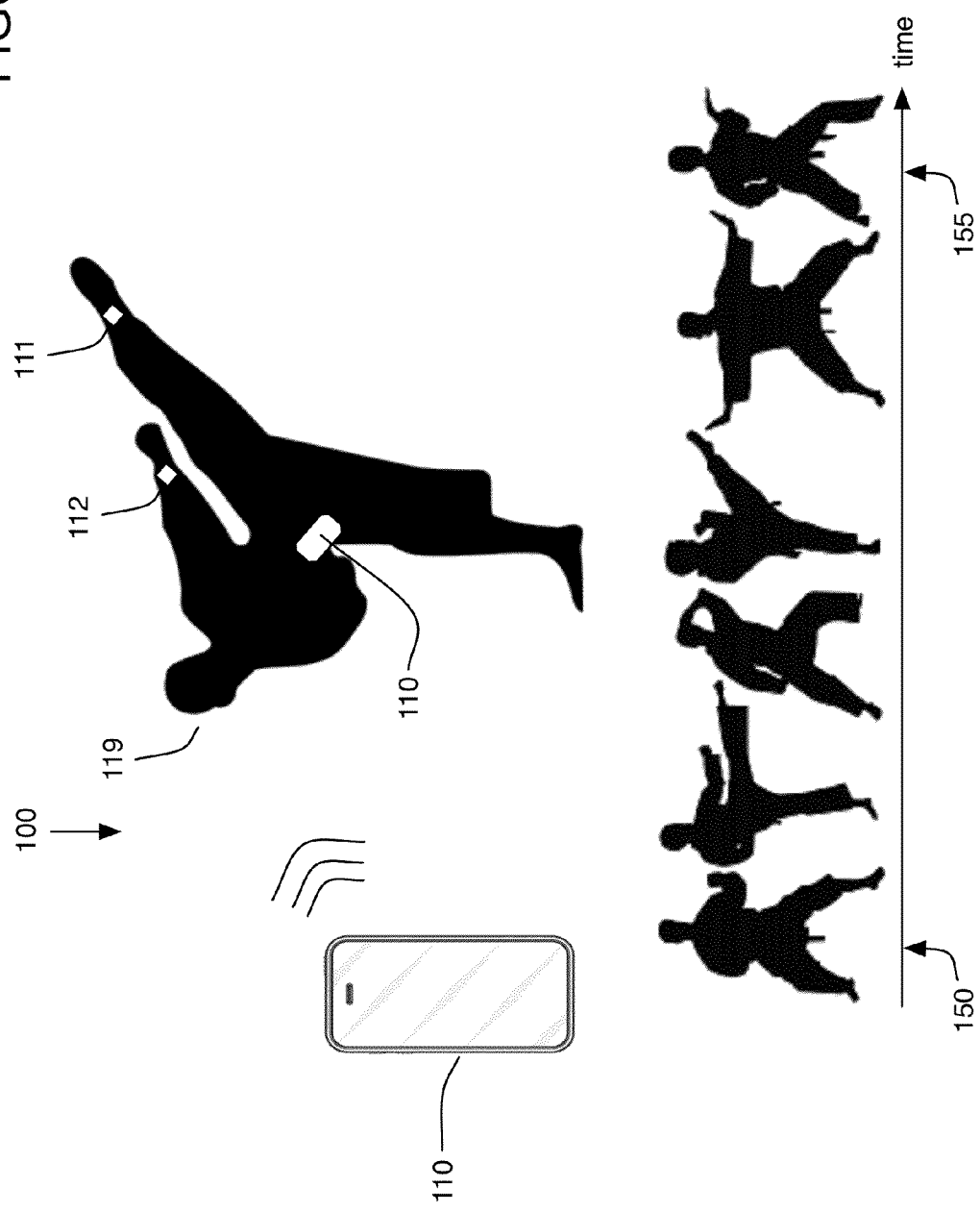
FIG. 1 illustrates an architectural view of the environment in which the apparatus is utilized.

FIG. 1 illustrates an architectural view of the environment in which apparatus is utilized. One or more embodiments described in the specification are related to a physical activity instructional apparatus 100 that includes mobile computer 110, which may or may not be coupled to performer or student 119 and any number of optional orientation sensors 111 and/or 112. In one or more embodiments, mobile computer 110 may be coupled with a medical patient, for example that is undergoing CPR, wherein the accelerations or movements of the chest during CPR are judged within an acceptable range for efficacy. The apparatus enables at least audio training and/or guidance for motion based tasks, detection of movement, optional audio command receipt and audio feedback based on the detected movement during the performance of two or more positions or moves, i.e., sequence of positions or moves 150-155. Embodiments enable a human to learn a sequence of martial arts moves as is shown or dance steps, yoga positions, or a sequence of positions or moves for any other type of physical activity including a golf, tennis or baseball swing for example. The apparatus may prompt the student to perform the positions or moves in sequence in a number of ways. Embodiments of the invention may utilize a mobile device that includes at least an audio output and which then optionally detects movement and then optionally provides audio or tactile feedback based on that movement to inform the student as to the correct or optionally incorrect performance, for example without requiring a visual display.

Figure 2:
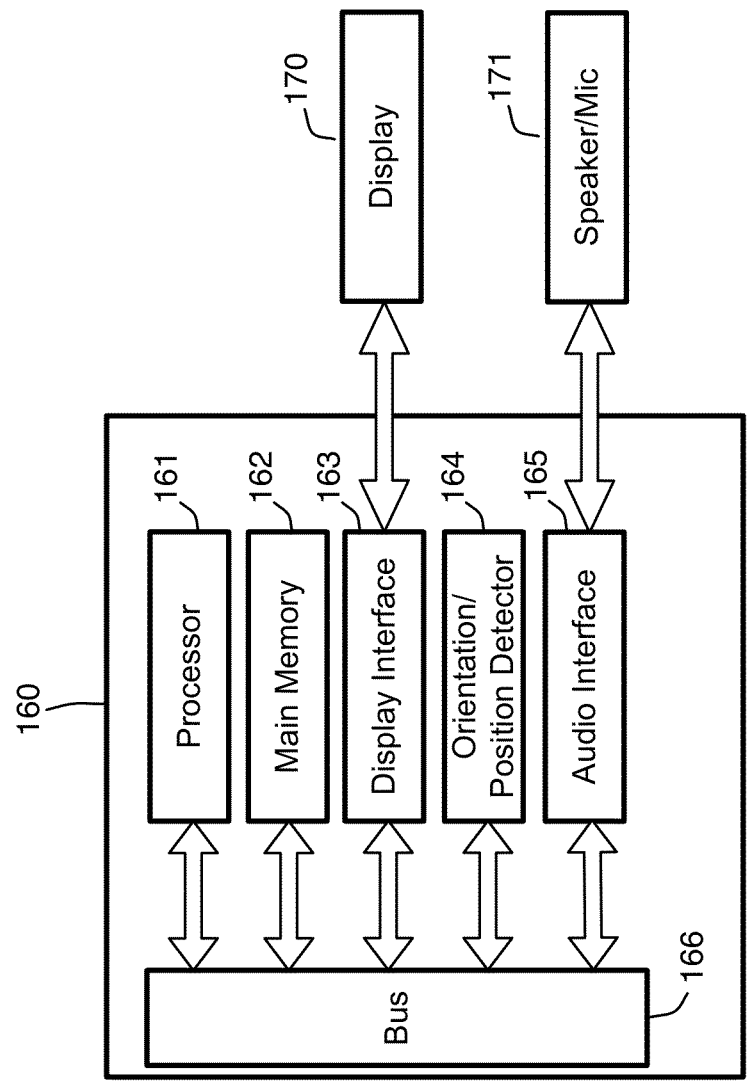
FIG. 2 illustrates a hardware diagram of an embodiment of the invention.

FIG. 2 illustrates a hardware diagram of an embodiment of the invention. Embodiments of the invention generally employ mobile computer 110 associated with student 119 (see FIG. 1). For example a "Smartphone" or other device such as a tablet computer, such as an IPAD® may be utilized or otherwise implemented with mobile computer hardware 160 in one or more embodiments of the invention. The mobile computer may for example include central processing unit 161, main memory 162, optional display interface 163 coupled with optional display 170, orientation detector 164, audio interface 165 coupled with speaker and optional microphone 171. Physical orientation detector 164 may include any combination of accelerometers and gyroscopes and/or inertial navigation system components in any number of axes so long as a position or move may be detected for the intended field of endeavor. As is known in the art, such accelerometers, gyroscopes and inertial navigation systems occur in integrated chipsets that are commercially available. The central processing unit, main memory, optional display interface, orientation detector and audio interface generally are coupled to one another over bus 166. Memory 162 may include sequence audio clips and other audio messages clips along with profiles or threshold values for location/orientation/velocity, etc., that central processor 161 utilizes to compare with values obtained from orientation detector 164 and/or orientation sensors 111 and 112 as shown in FIG. 1. The central processing unit is generally coupled with the audio output and the memory wherein the central processing unit is configured to play a first audio clip on the audio output wherein the first audio clip is associated with a first position or move. This audio clip for example may be utilized to cue or otherwise prompt the user to perform a named position or move. One such move may include a karate punch of many varieties, or for the student to yell "kiai", or pause, etc. The central processor 161 is generally also configured to obtain at least one physical orientation in the form of a digital value for example from the physical orientation detector 164, and/or 111 and/or 112. This may involve any type of query or interrupt from the physical orientation detector to obtain a location, orientation (magnetic or with respect to the horizon or both), velocity, acceleration, angular velocity, or any other quantity that enables the determination of a position or move. Central processing unit 161 then generally is configured to play a second audio clip from memory 162 via audio interface 165 and audio output speaker 171 based on the at least one physical orientation, or alternatively play nothing if the position/move is correct, or optionally vibrate if the position/move is incorrect for example. The second audio clip may involve playing an audio clip associated with the next position or move, if the detected at least one physical orientation is within an acceptable range of the position or move that should occur at that point in the sequence, or an instructional message for example informing the student as to the angle/position/speed and threshold or range or optional corrective audio message. At the end of the sequence, a primary reinforcer message or congratulatory message, or message with respect to the duration of the sequence or any other message may be played if desired.

In one or more embodiments, the physical orientation sensor is physically coupled with the mobile computer and the mobile computer is physically coupled with the performer or student, (or as previously described with a patient or other person that is undergoing the physical motion). This is shown on the upper right side of FIG. 1. In this embodiment, the mobile computer contains the sensor that determines how the performer or student is positioned or has moved. Profiles of the various positions and/or moves are stored in memory and compared against the detected values to determine whether the student is in a given orientation or position or has performed a particular move. The same holds with a performer that is performing a checklist, for example maintaining a piece of equipment wherein the system is judging whether the performer is rotating a particular part in the correct direction for example.

Alternatively, or in combination, in one or more embodiments, one or more sensors 111 and/or 112 or any other number of sensors that are not located in the mobile computer are utilized to determine position or moves, for example on extremities of the student and relay the positions to the mobile computer. The mobile computer may also optionally include a sensor that may be utilized in combination with the other sensors for example. In these embodiments, the physical orientation sensor(s) is/are physically coupled with the student and the mobile computer is (as shown in upper right portion of FIG. 1) or is not physically coupled with the student (which is shown as the left portion of FIG. 1, wherein the phone may be located near enough to student 119 for student 119 to hear the audio associated with the sequence of positions or moves and also wherein mobile computer 110 can wirelessly obtain values from sensors 111 and/or 112.

Figure 3:
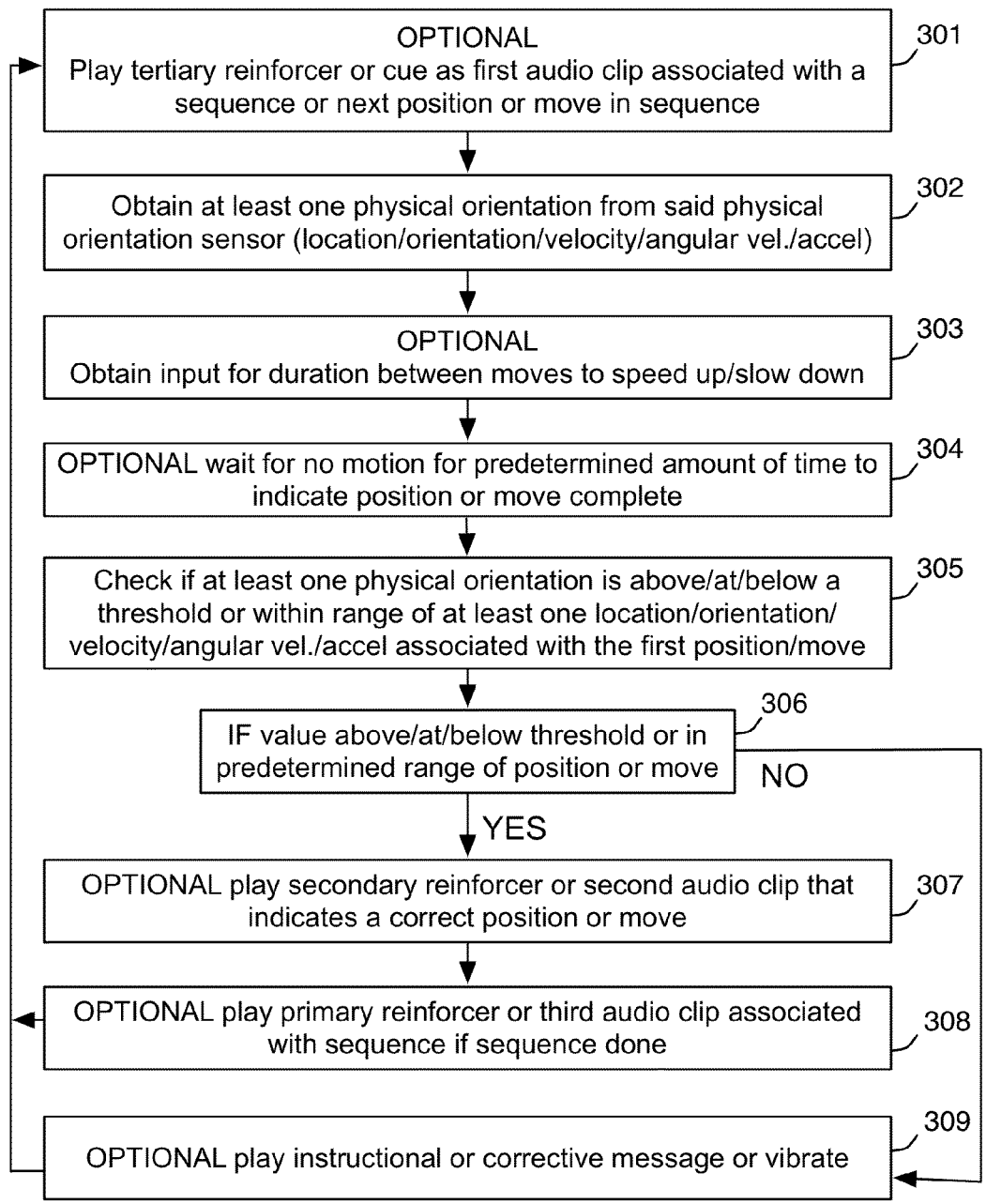
FIG. 3 illustrates a flowchart of an embodiment of the method utilized by the hardware of FIG. 2.

FIG. 3 illustrates a flowchart of an embodiment of the method utilized by the hardware of FIG. 2. Generally, a tertiary reinforcer or cue, for example in the form of an audio clip associated with a sequence name or next position or move name is played at 301. At least one physical orientation (location/orientation/velocity/angular velocity/acceleration) is obtained at 302 from either sensor 164 in mobile computer 110 or from sensors 111 and/or 112 or any other number of sensors not located in mobile computer 110. If mobile computer 110 is coupled to performer or student 119, then the sensor in mobile computer 110 may be utilized if there are no other sensors. If other sensors are available, then they may be utilized to obtain data indicative of a position or move. Physical orientation data is collected at 302 for a predetermined amount of time or until a motion event for example over, at, or above a desired threshold is achieved.

Optionally, the apparatus may listen for audio commands at 303, for example to speed up or slow down the rate at which the sequence is to be judged, and/or audio clips are to be played, to request that the position or move name be repeated, or to accept any other audio command such as "stop" or "pause" or "begin from start" for example. Optionally, the apparatus may wait for a predetermined amount of time for no motion or example or accept any other input or gesture to indicate that the position or move is complete for example to indicate that the student desired a check of the position or move at 304.

In order to determine whether a student has performed a particular position or move, at least one physical orientation is compared against a threshold or range of values for example in a time window that define the first position or move at 305. In one or more embodiments this occurs by sampling the location, orientation, velocity, angular velocity and/or acceleration and comparing the value or curve with the value or curve of a given orientation or move at that position in the sequence of moves (see FIG. 1 positions 150-155). For example, if the mobile computer contains the physical orientation sensor, and it is mounted on the student's waist, then a curve for acceleration that indicates a clockwise punch rotation is compared to the detected values to determine if the student has rotated in that manner, for example with a range of rotation speeds, or above, at, or below a particular threshold of speed or angular speed or any other measurable quantity for example. Any other method of comparing detected sensor values with a desired position or move value with or without respect to time is in keeping with the spirit of the invention. If the value or values in the form of a time curve is within the acceptable limits, i.e., threshold or multiple thresholds in the form of a range associated with the desired position or move that is supposed to occur at that point in time in the sequence as checked at 306, then the optional secondary reinforcer or second audio clip is optionally played at 307. In one or more embodiments, this may be in the form of a sound "click" or other audio output, or vibration or any other stimulus that indicates an event marker. If the sequence has been performed in entirety, then a tertiary reinforcer or the third audio clip may be played to indicate a correctly performed sequence of two or more positions or moves at 308. The third audio clip may be in the form of a congratulatory audio clip, and/or total time of duration or any other audio clip as desired including humorous audio clips, such as movie quotes, e.g., "wax on wax off", etc. Processing continues at 301 wherein the central processing unit 161 may play an audio clip from memory 162 that is associated with a second position or move, i.e., next position or move in the sequence or checklist. If the value or range at 306 is not in accordance with the desired position or move, an audio message that is instructive or optionally corrective in nature may be played at 309, or any other stimulus, e.g., vibration may be performed. In other embodiments employing only positive feedback, audio feedback may be withheld.

FIG. 4 illustrates a comparison of a move envelope, i.e., two time based thresholds, with actual sensor data obtained from one of the sensors in the mobile computer or otherwise coupled with the student. As shown height 410 with respect to time as obtained via sensor 164 or 112 or 111 is compared with upper and lower envelope for move 153. If the move is within the defined ranges for a predetermined time that move 153 is supposed to take, then the move is designated as a valid or otherwise correct move. If height 410 occurs to early (left on the time axis) or too late (right on the time axis) or is not high enough (up in the figure orthogonal to the time axis), then the move is considered to be incorrect. Instructional or corrective feedback may occur at this point, or alternatively for entirely positive reinforcement training, this may not occur. Although height may be obtained from an accelerometer based orientation sensor by integrating acceleration from three axes, any other method of obtaining any position, orientation, velocity, angular velocity, acceleration from sensors 164 or 111 or 112 is in keeping with the spirit of the invention. For example, with a mobile computer on the waist of student 119 as shown, an angular rotation curve over time as obtained from the sensors may also be compared to an upper or lower threshold or upper or lower envelope for a predetermined time that the move should take to determine if the user is rotating in the correct direction or fast enough for a given move. Any combination of comparisons of thresholds and/or ranges that are linear in time or curves of any type with respect to time or otherwise may be utilized in keeping with the spirit of the invention. Although shown as one graph for exemplary purposes, each element 111, 112 may also have associated graphs in one or more dimensions or units of measure (velocity/acceleration, etc.) The graphs may overlap in time and require any subset or combination of in-range segments to determine or otherwise judge a performance for acceptable values or ranges, or otherwise judge a performer or student as to the level of mastery, for example novice, expert or master. Although shown as a particular type of sport, one skilled in the art will appreciate that embodiments of the invention may be utilized with any physical activity.

Embodiments of the invention do not require a visual display, unlike known devices, however, a visual display may be utilized. For example, the mobile computer may play a video of the sequence when requested by the student.

While the invention herein disclosed has been described by means of specific embodiments and applications thereof, numerous modifications and variations could be made thereto by those skilled in the art without departing from the scope of the invention set forth in the claims.

What is claimed is:

1. A physical activity instructional apparatus comprising:
a physical orientation sensor;
a mobile computer associated with a person to undergo motion comprising
an audio output;
a memory;
a central processing unit coupled with said audio output and said memory wherein said central processing unit is configured to
obtain at least one physical orientation from said physical orientation sensor;
check if said at least one physical orientation is above, at, or below a threshold or within or outside of a range to indicate a position or move performed is correct; and,
assert a secondary reinforcer wherein said secondary reinforcer comprises only positive feedback if said position or move is correct;
wherein said secondary reinforcer is a message given to said person close to a moment when said position or move is performed;
wherein said message comprises one or more of
a play of a second audio clip on said audio output,
a tactile stimulus, and
a vibratory stimulus;
such that said message occurs without use of a visual display; and,
wherein said one or more of said second audio clip, said tactile stimulus and said vibratory stimulus indicates that said position or move is correct.

2. The physical activity instructional apparatus of claim 1 wherein said physical orientation sensor is physically coupled with said mobile computer and wherein said mobile computer is physically coupled with said person to undergo motion.

3. The physical activity instructional apparatus of claim 1 wherein said physical orientation sensor is physically coupled with said person to undergo motion and wherein said mobile computer is not physically coupled with said person to undergo motion.

4. The physical activity instructional apparatus of claim 1 wherein said physical orientation sensor is physically coupled with said person to undergo motion and wherein said mobile computer is physically coupled with said person to undergo motion.

5. The physical activity instructional apparatus of claim 1 further comprising:
   at least one other physical orientation sensor physically coupled with said person to undergo motion and not physically coupled with said mobile computer.

6. The physical activity instructional apparatus of claim 1 wherein said mobile computer further comprises an audio output and wherein said wherein said central processing unit is further configured to assert a tertiary reinforcer associated with a sequence of two or more positions or moves or a next position or move, such that said assert said tertiary reinforcer comprises a play of a first audio clip on said audio output wherein said first audio clip is associated with said sequence of two or more positions or moves or said next position or move.

7. The physical activity instructional apparatus of claim 1 wherein said mobile computer further comprises a vibration element and wherein said assert said secondary reinforcer comprises said vibration stimulus, wherein said vibration stimulus comprises a vibration of said vibration element wherein said vibration indicates that said position or move is correct.

8. The physical activity instructional apparatus of claim 1 wherein said mobile computer is further configured to assert an instructional message if said position or move is not correct.

9. The physical activity instructional apparatus of claim 1 wherein said mobile computer is further configured to assert a primary reinforcer that indicates total duration of time for a number of positions or moves in sequence comprising said two or more positions or moves.

10. The physical activity instructional apparatus of claim 1 wherein said mobile computer is further configured to assert a primary reinforcer comprising a congratulatory message if all of said two or more positions or moves are correct or a category of mastery.

11. The physical activity instructional apparatus of claim 1 wherein said central processing unit is further configured to
   wait for a pause of motion indicated in said at least one physical orientation before said check if said at least one physical orientation is above, at, or below said threshold or within or outside of said range.

12. The physical activity instructional apparatus of claim 1 wherein said mobile computer further comprises:
   an audio input;
   wherein said central processing unit is further configured to obtain audio input that indicates said assert said tertiary reinforcer is to occur.

13. The physical activity instructional apparatus of claim 1 wherein said mobile computer further comprises:
   an audio input;
   wherein said central processing unit is further configured to
      obtain audio input and increase or decrease an amount of time between said assert said tertiary reinforcer or repeat said tertiary reinforcer.

14. The physical activity instructional apparatus of claim 1 wherein said mobile computer further comprises:
   a visual display;
   wherein said central processing unit is further configured to
      play a video on said visual display of said two or more positions or moves when requested by said person.

15. A physical activity instructional apparatus comprising:
   a physical orientation sensor;
   a mobile computer associated with a person to undergo motion comprising
      a memory;
      an audio output;
      a central processing unit coupled with said audio output and said memory wherein said central processing unit is configured to
         assert a tertiary reinforcer associated with a sequence of two or more positions or moves or a next position or move;
         obtain at least one physical orientation from said physical orientation sensor;
         check if said at least one physical orientation is above, at, or below a threshold or within or outside of a range to indicate a position or move performed is correct; and,
         assert a secondary reinforcer wherein said secondary reinforcer comprises only positive feedback if said position or move is correct;
            wherein said secondary reinforcer is a message given to said person close to a moment when said position or move is performed;
         wherein said message comprises one or more of
            a play of a second audio clip on said audio output,
            a tactile stimulus, and
            a vibratory stimulus;
            such that said message occurs without use of a visual display; and,
            wherein said one or more of second audio clip, said tactile stimulus and said vibratory stimulus indicates that said position or move is correct.

16. The physical activity instructional apparatus of claim 15 wherein said assert said tertiary reinforcer comprises a play of a first audio clip on said audio output wherein said first audio clip is associated with said sequence of two or more positions or moves or said next position or move.

17. The physical activity instructional apparatus of claim 15 wherein said assert said primary reinforcer comprises a congratulatory message if all of said two or more positions or moves are correct or a category of mastery; such that said message given to said person close to a moment when said position or move is performed is given in order to inform said person that said primary reinforcer is forthcoming.

18. The physical activity instructional apparatus of claim 15 wherein said mobile computer further comprises:
   an audio input;
   wherein said central processing unit is further configured to
      obtain audio input and increase or decrease an amount of time between said assert said tertiary reinforcer or repeat said tertiary reinforcer.

19. A physical activity instructional apparatus comprising:
   a physical orientation sensor;
   a mobile computer associated with a person to undergo motion comprising
      a memory;
      an audio input;
      an audio output;
      a central processing unit coupled with said audio output and said memory wherein said central processing unit is configured to
         assert a tertiary reinforcer comprising a play of a first audio clip associated with a sequence of two or more positions or moves or a next position or move;
         obtain at least one physical orientation from said physical orientation sensor;
         obtain audio input and increase or decrease an amount of time between said assert said tertiary reinforcer or repeat said tertiary reinforcer;

check if said at least one physical orientation is above, at, or below a threshold or within or outside of a range to indicate a position or move performed is correct;
assert a secondary reinforcer wherein said secondary reinforcer comprises only positive feedback if said position or move is correct; and
assert a primary reinforcer if said position or move is correct;
 wherein said primary reinforcer is an award;
 wherein said secondary reinforcer is a message given to said person close to a moment when said position or move is performed, in order to inform said person that said primary reinforcer is forthcoming;
 wherein said message comprises one or more of
  a play of a second audio clip on said audio output,
  a tactile stimulus, and
  a vibratory stimulus;
  such that said message occurs without use of a visual display; and
 wherein said one or more of said second audio clip, said tactile stimulus and said vibratory stimulus indicates that said position or move is correct; and,
 wherein said assert said primary reinforcer comprises a congratulatory message after said sequence and if all of said two or more positions or moves are correct or a category of mastery.

20. The physical activity instructional apparatus of claim 1 wherein said central processing unit is further configured to assert a primary reinforcer if said position or move is correct, such that said message given to said person close to a moment when said position or move is performed is given in order to inform said person that said primary reinforcer is forthcoming.

* * * * *